United States Patent

[11] 3,614,300

| [72] | Inventor | Floyd A. Wilson<br>Marion, Ind. |
|---|---|---|
| [21] | Appl. No. | 83,053 |
| [22] | Filed | Oct. 22, 1970 |
| [45] | Patented | Oct. 19, 1971 |
| [73] | Assignee | Anaconda Wire and Cable Company |

[54] POWER CABLE WITH POLYPROPYLENE COVERED GROUND CHECK STRAND
1 Claim, 1 Drawing Fig.

[52] U.S. Cl. .................................................. 174/115, 174/110 R, 174/120 R
[51] Int. Cl. ..................................................... H01b 9/00
[50] Field of Search............................................ 174/110 R, 110 A, 110 N, 120 R, 115

[56] References Cited
UNITED STATES PATENTS
3,448,204  6/1969  Perrone.................... 174/115

*Primary Examiner*—E. A. Goldberg
*Attorney*—Victor F. Volk

ABSTRACT: A three-phase shovel cable having ethylene-propylene insulation on the power conductors and bare grounding strands comprises a ground-check strand with a heavy wall of polypropylene insulation that permits the ground check to outlast the other strands in flex endurance.

PATENTED OCT 19 1971
3,614,300
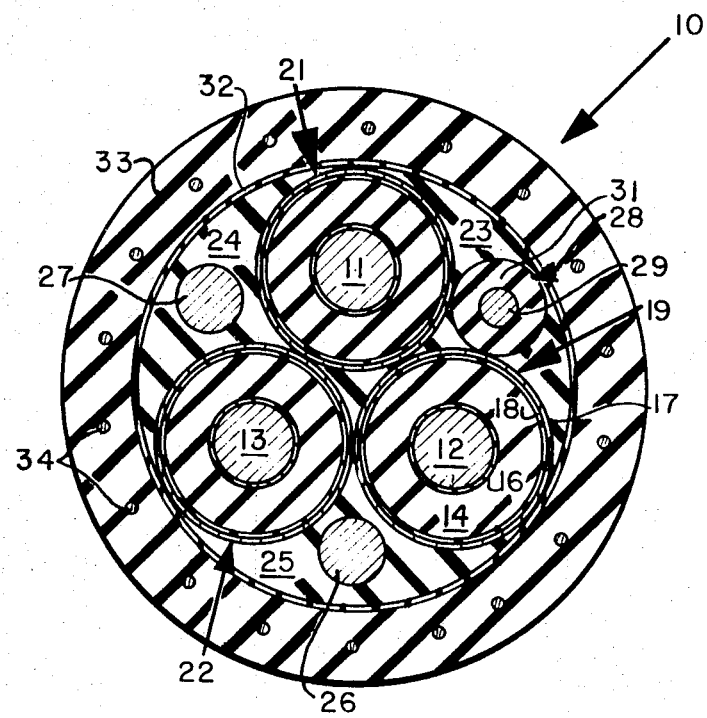
INVENTOR.
FLOYD A. WILSON
BY
V. F. Volk
HIS AGENT

POWER CABLE WITH POLYPROPYLENE COVERED GROUND CHECK STRAND

BACKGROUND OF THE INVENTION

In the operation of heavy portable electric-powered equipment such as the power shovels used in quarries and open-pit mines the cables supplying power to the equipment may be rated as high as 2,500 volts. It is essential to such cables that they include grounding strands and means for monitoring the continuity of the grounding strands during the life of the cable. For this purpose it has been known to include in the cable construction an insulated ground-check strand, connected, in series with the grounding strands, to an alarm circuit that would signal an alarm when the grounding strands failed. Cables of this type will include those designated SH-C GC and SH-D GC in Bureau of Mines published Schedule 2G, and the present invention is particularly directed to cables covered by this designation. High voltage cables for quarry shovels and such may be extremely expensive since they may cost in excess of 10 dollars per foot and extend for hundreds, if not thousands, of feet. The ground-check strand is the least of the current carrying elements of such a cable, still as the cables are used, if the ground-check strand fails, the whole cable will be out of service until the fault can be located and, if possible, repaired. Since the ground-check strand is really there for the purpose of monitoring the grounding strands, it would really be preferable if there were no question but that it would outlast them. Since, however, there are two of the grounding strands each of which is larger than the ground-check strand, cables of known construction can provide no such assurance. In the known cables the ground-check strand is usually insulated with the same composition as that selected for the power conductor, such as ethylene-propylene copolymer. The choice of the copolymer for the power conductor insulation depends on its excellent dielectric properties and their retention after service at high temperatures.

SUMMARY

I have found that the application of a heavy wall of polypropylene insulation to the ground-check strand has the unexpected effect of ensuring its continuity beyond that of the grounding strands, and my cable, which is suitable for electric-powered quarry shovels and the like, comprises three-stranded copper conductors insulated with vulcanized ethylene-propylene copolymer composition. These conductors are twisted together in a triangular configuration and two bare stranded copper grounding strands are cabled in different interstices of this configuration. My stranded copper ground-check strand is cabled in the remaining interstice. This is surrounded by a cylindrical wall of polypropylene insulation at least 45 mils thick. A heavy, tough polymeric jacket covers the cable overall.

BRIEF DESCRIPTION OF THE DRAWING

The FIGURE shows a cable of my invention in section.

DETAILED DESCRIPTION OF A PREFERRED EMBODIMENT

Referring to the drawing, a SH-D GC cable 10 for 15 kv., 193 ampere service is illustrated, although it will be readily understood that cables for service at other voltages and ampacities can be built in accordance with my invention by persons skilled in cable making, by following the disclosures hereinafter made. Three-1/0 Awg soft tinned copper conductor strands 11, 12, 13 are each made up of 259 copper wires formed by stranding seven bunched strands of 37 wires each. The conductor strand 12 is covered with a 219 mil wall 14 of vulcanized ethylene-propylene copolymer over a thin layer of extruded semiconducting polymer 16 in direct contact with the copper of the conductor 12. A copper wire shield 17 is braided over a helically-applied semiconducting polymeric tape 18 to comprise an insulated shielded high-voltage conductor 19. Similarly the strands 11 and 13 are covered by layers of strand shielding, insulation, and insulation shielding to form insulated, shielded, conductors 21 and 22. The shielded conductors 19, 21, and 22 are twisted together with a lay of about 6.8 inches in a triangular configuration having helical interstices 23, 24, 25. Grounding strands 26, 27, size 4 Awg, are cabled in the interstices 24, 25. These each comprise 259 soft copper wires size 28 Awg made up by twisting 7 strands of 37 wires each with a lay of about 4.4 inches. In the interstice 23 an insulated ground-check conductor 28 consists of a soft copper, size 8 Awg ground-check strand 29 surrounded by about a 62 mil wall of thermoplastic polypropylene insulation 31. I have found that the insulation wall 31 can be as low as about 45 mils but that there is no advantage in increasing the wall thickness much above 62 mils, indeed the thickness will be limited by the size of the interstice 23.

The remainder of the space forming a cylinder around the outside of the conductors 19, 21, 22 is filled with fiber-reinforced rubber filler strings and the whole assembly is wrapped with a lightweight binder 32 which secures it during the extrusion of a double-walled neoprene (polychloroprene) jacket 33 reinforced with a nylon Seine twine braid 34. The jacket 33 is compounded with carbon black for extreme abrasion resistance and cured in lead in a manner known to make the jacket tough, dense, and tear resistant.

EXAMPLE

A size 4 Awg SH-D GC cable was made up in two constructions identical except that one had the ground-check conductor conventionally insulated with ethylene-propylene copolymer of the same composition as that applied to the power conductors while the other had the ground-check conductor, only, insulated with polypropylene. The cables were then flexed by bending them back and forth around small diameter sheaves until all the wires in the ground-check strand had broken. This occurred at about 6,000 cycles for the conventional cable but the polypropylene insulated ground-check strand did not open electrically until 65,000 flexings.

I have invented a new and useful flexible power cable of which the foregoing description has been exemplary rather than definitive and for which I desire an award of Letters Patent as defined in the appended claim.

I claim:

1. A cable suitable for electric-powered quarry shovels and the like comprising:
   - A. three stranded copper conductors insulated with vulcanized ethylene-propylene copolymer composition and twisted together in a triangular configuration,
   - B. two bare stranded copper grounding strands cabled each in a different interstice of said configuration,
   - C. a stranded copper ground-check strand cabled in another interstice of said configuration,
   - D. a cylindrical wall of polypropylene insulation having a thickness not less than about 45 mils surrounding said ground-check strand, and
   - E. a heavy, tough polymeric protective jacket covering said cable overall.